US010090969B2

(12) United States Patent
Sun et al.

(10) Patent No.: US 10,090,969 B2
(45) Date of Patent: Oct. 2, 2018

(54) METHOD AND APPARATUS FOR TRANSMISSION

(71) Applicant: Marvell World Trade Ltd., St. Michael (BB)

(72) Inventors: Yakun Sun, San Jose, CA (US); Hongyuan Zhang, Fremont, CA (US); Liwen Chu, San Ramon, CA (US); Lei Wang, San Diego, CA (US); Jinjing Jiang, San Jose, CA (US); Rui Cao, Fremont, CA (US); Yan Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/629,420

(22) Filed: Jun. 21, 2017

(65) Prior Publication Data
US 2017/0366301 A1  Dec. 21, 2017

Related U.S. Application Data

(60) Provisional application No. 62/352,708, filed on Jun. 21, 2016.

(51) Int. Cl.
*H04L 1/00* (2006.01)
*H04L 27/26* (2006.01)
(Continued)

(52) U.S. Cl.
CPC .......... *H04L 1/0083* (2013.01); *H04L 1/0033* (2013.01); *H04L 27/2613* (2013.01);
(Continued)

(58) Field of Classification Search
CPC . H04L 1/0083; H04L 27/2613; H04L 1/0033; H04L 5/0091; H04L 5/0062; H04W 4/70
See application file for complete search history.

(56) References Cited

U.S. PATENT DOCUMENTS

2013/0235773 A1* 9/2013 Wang ................ H04W 52/0206
370/311
2015/0023335 A1* 1/2015 Vermani .............. H04B 7/0452
370/338
(Continued)

OTHER PUBLICATIONS

International Search Report and Written Opinion dated Aug. 24, 2017 in PCT/US2017/038578.
(Continued)

*Primary Examiner* — Kenneth Lam

(57) ABSTRACT

Aspects of the disclosure provide an apparatus that includes a transceiver circuit and a processing circuit. The transceiver circuit is configured to receive a trigger signal this is transmitted by another apparatus. The trigger signal triggers transmissions by a first group of apparatuses including the apparatus, and defers transmissions by a second group of apparatuses that interfere the transmissions by the first group of apparatuses. The processing circuit is configured to, in response to the trigger signal, generate a frame with a first preamble structure that is different from a second preamble structure that is used by the second group of apparatuses, and provide the generated frame to the transceiver circuit for transmission.

20 Claims, 4 Drawing Sheets

(51) Int. Cl.
*H04W 4/70* (2018.01)
*H04L 5/00* (2006.01)

(52) U.S. Cl.
CPC ............ *H04W 4/70* (2018.02); *H04L 5/0062* (2013.01); *H04L 5/0091* (2013.01)

(56) References Cited

U.S. PATENT DOCUMENTS

| | | | |
|---|---|---|---|
| 2016/0119933 A1* | 4/2016 | Merlin | H04L 5/0048 370/312 |
| 2017/0019863 A1* | 1/2017 | Cariou | H04W 52/283 |
| 2017/0048882 A1* | 2/2017 | Li | H04L 5/0037 |
| 2017/0113315 A1 | 4/2017 | Sun et al. | |
| 2017/0118315 A1* | 4/2017 | Sun | H04L 69/22 |
| 2017/0134138 A1* | 5/2017 | Madhavan | H04L 5/0055 |
| 2017/0188376 A1* | 6/2017 | Noh | H04W 72/085 |
| 2018/0124746 A1* | 5/2018 | Choi | H04W 72/04 |
| 2018/0138959 A1* | 5/2018 | Chun | H04B 7/0626 |

OTHER PUBLICATIONS

Chittabrata Ghosh (Intel): "Technical Feasibility for LRLP ; 11-15-1108-00-lrlp-technical-feasibility-for-lrlp", IEEE Draft;11-15-1108-00-LRLP-Technical-Feasibility-For-LRLP, IEEE-SA Mentor, vol. 802.11 LRLP, XP068098350, Sep. 14, 2015, pp. 1-10.

* cited by examiner

METHOD AND APPARATUS FOR TRANSMISSION

INCORPORATION BY REFERENCE

This present disclosure claims the benefit of U.S. Provisional Application No. 62/352,708, "TRIGGERED LOW POWER LONG RANGE TRANSMISSION" filed on Jun. 21, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall, warehouse, and the like to link two or more devices using wireless connections within a limited area to a network. In an example, a WLAN is used to provide wireless connections for non-human devices, such as sensors, actuators, and the like in an Internet of things (IoT).

SUMMARY

Aspects of the disclosure provide an apparatus that includes a transceiver circuit and a processing circuit. The transceiver circuit is configured to receive a trigger signal this is transmitted by another apparatus. The trigger signal triggers transmissions by a first group of apparatuses including the apparatus, and defers transmissions by a second group of apparatuses that interfere the transmissions by the first group of apparatuses. The processing circuit is configured to, in response to the trigger signal, generate a frame with a first preamble structure that is different from a second preamble structure that is used by the second group of apparatuses, and provide the generated frame to the transceiver circuit for transmission.

According to an aspect of the disclosure, the processing circuit is configured to decode, from the trigger signal, one or more transmission control parameters in physical layer that are determined by the other apparatus, use the one or more transmission control parameters for transmission, and simplify the first preamble structure not to indicate the one or more transmission control parameters in the frame for transmission.

In an embodiment, the processing circuit is configured to decode at least one of modulation coding scheme, multiple-input-multiple-output parameters and data unit length from the trigger signal. For example, the processing circuit is configured to simplify the first preamble structure to omit a signal field for carrying the one of more transmission control parameters.

In an example, the processing circuit is configured to omit one or more fields of the second preamble structure in the first preamble structure. In another example, the processing circuit is configured to omit physical layer classification information in the first preamble structure.

According to an aspect of the disclosure, the first preamble structure is configured to include more duplicated patterns in time/frequency domain than patterns in the second preamble structure.

In an embodiment, the processing circuit is configured to select the first preamble structure from a plurality of preamble structures that are supported by the apparatus based on an indication in the trigger signal. In another embodiment, the processing circuit is configured to cause the transceiver circuit to transmit in response to the trigger signal without clear channel assessment. In another embodiment, the processing circuit is configured to select the first preamble structure from a plurality of preamble structures that are supported by the apparatus based on a decision by the apparatus itself. In an example, the processing circuit is configured to select the first preamble structure based on various parameters are available to the apparatus, such as a received signal level of the trigger signal, historical information of preamble structures, location of the other apparatus and the like.

Aspects of the disclosure provide a method of transmission. The method includes receiving, by an apparatus, a trigger signal this is transmitted by another apparatus. The trigger signal triggers transmissions by a first group of apparatuses including the apparatus, and defers transmissions by a second group of apparatuses that interfere the transmissions by the first group of apparatuses. Further, the method includes generating a frame with a first preamble structure that is different from a second preamble structure that is used by the second group of apparatuses and transmitting a signal carrying the generated frame.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
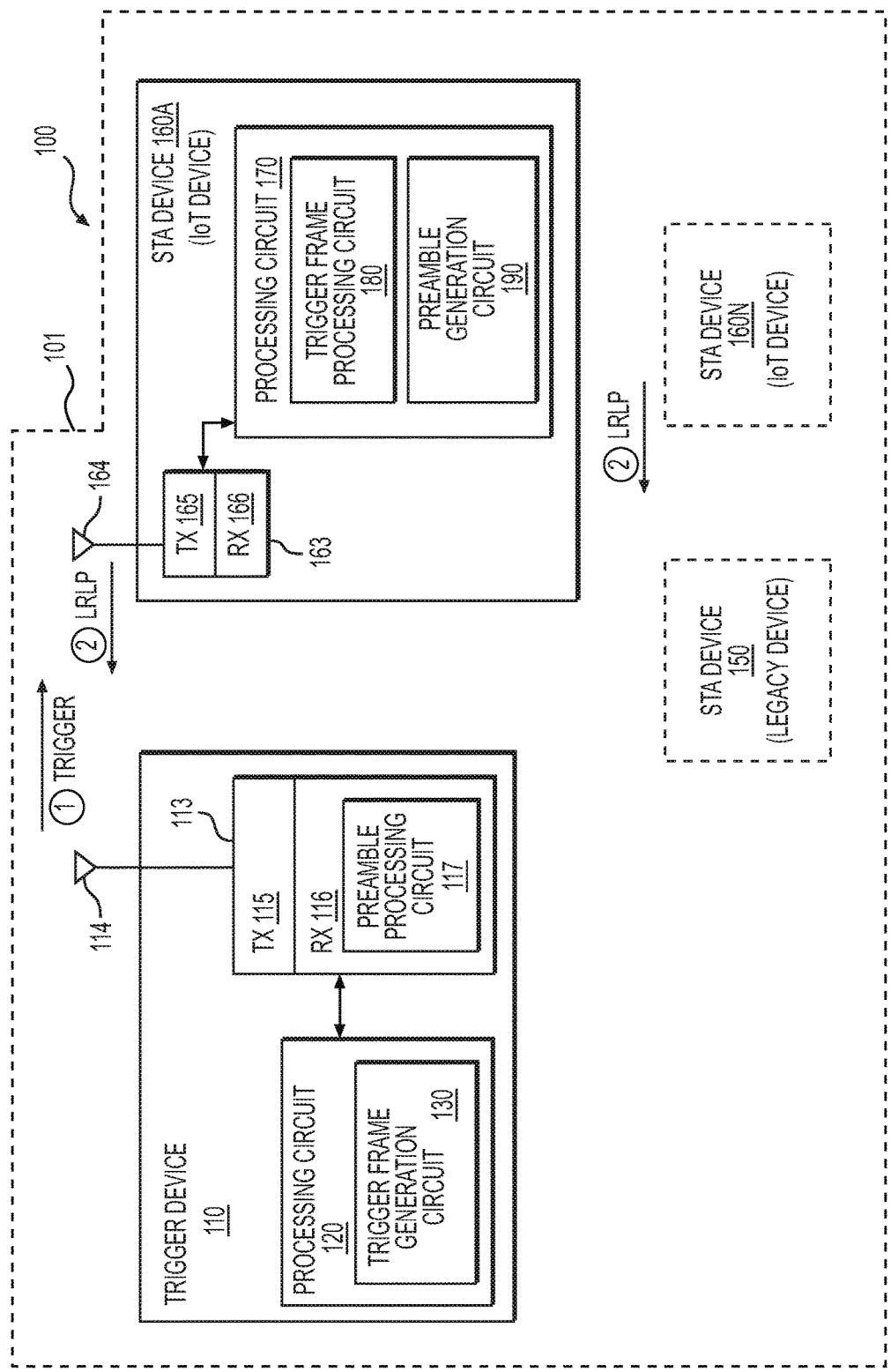
FIG. 1 shows a block diagram of a network 100 according to an embodiment of the disclosure.

FIG. 1 shows a block diagram of a network 100 according to an embodiment of the disclosure. The network 100 includes a trigger device 110 and a first group of electronic devices 160A-N in wireless communication. According to an aspect of the disclosure, the first group of electronic devices 160A-N are configured to perform transmissions that are sensitive to interferences by other devices, such as a second group of electronic devices 150. Thus, in the FIG. 1 example, the trigger device 110 is configured to generate and transmit a trigger signal to defer transmissions by the other devices. In response to the trigger signal, the first group of electronic devices 160A-N are configured to perform transmissions with a specific preamble structure to improve immunity to interferences.

The network 100 includes interconnections that are implemented using any suitable network technology, such wired, wireless, a local area network (LAN), a wireless LAN (WLAN), a cellular network, a fiber optical network, a wide area network (WAN), a peer-to-peer network, the Internet, and the like. In an example, the trigger device 110, the first group of electronic devices 160A-N and the second group of electronic devices 150 are in a basic service set (BSS) 101 that is implemented using WLAN technology to interconnect the trigger device 110 with the first group of electronic devices 160A-N, and the second group of electronic devices 150. In an example, the network 100 includes other suitable interconnections (not shown), such as a LAN, a fiber optical network, and the like to provide connections for the BSS 101 to be connected to for example Internet.

It is noted that, in another example, the trigger device 110, the first group of electronic devices 160A-N and the second group of electronic devices 150 use other suitable wireless technology, such as cellular network technology for communication.

In an embodiment, the BSS 101 is an infrastructure type basic service set. In an example, the trigger device 110 is an access point (AP) device, and the first group of electronic devices 160A-N and the second group of electronic devices 150 are station (STA) devices. The first group of electronic devices 160A-N and the second group of electronic devices 150 communicate through the trigger device 110, and the trigger device 110 includes network hardware and software configured to serve as a bridge to allow wireless compliant devices, such as the first group of electronic devices 160A-N and the second group of electronic devices 150 to connect to other part of the network 100.

In another example, the trigger device 110 is a STA device configured to receive information, via wireless connection, from one or more of the first group of electronic devices 160A-N and process the information. In an embodiment, the trigger device 110 is a relay device and forwards the received information to another device via wired and/or wireless connection. In another embodiment, the trigger device 110 is a central controller configured to generate control signals based on the information, and provide the control signals, via wireless connection, to one or more of the first group of electronic devices 160A-N.

Each of the first group of electronic devices 160A-N and the second group of electronic devices 150 can be any suitable device, such as a desktop computer, a laptop computer, a tablet computer, a smart phone, a personal digital assistant (PDA), a smart watch, a smart camera, a smart TV, a smart voice recorder, a wearable device, a sensor device, an actuator device, a plug-in device for a home appliance, a home appliance, a locker, a light bulb, a power switch, and the like.

According to an aspect of the disclosure, the first group of electronic devices 160A-N are configured to communicate through a wireless link with low power, low rate and long range. In an embodiment, the first group of electronic devices 160A-N are used in Internet of things (IoT). For example, the first group of electronic devices 160A-N are remote sensors and/or smart machines, and are distributed in areas away from traditional infrastructure and a convenient power supply. In an example, the first group of electronic devices 160A-N are battery powered devices and are expected to transmit small packets of data at a regular interval for years without replacing and/or recharging batteries. In another example, the first group of electronic devices 160A-N are distributed over a relatively large area, and are expected to transmit over a relatively long range, such as over one or more kilometers.

Accordingly, in an embodiment, the first group of electronic devices 160A-N are configured to perform long range and low power (LRLP) transmission that is sensitive to interference from noise and/or other signals. In an example, the LRLP transmission arrives at a recipient device, such as the trigger device 110, with a very low signal level, such as about the noise floor or below the noise floor. In the embodiment, the LRLP transmission is vulnerable to channel access contention, for example from legacy devices. For example, an ongoing LRLP transmission is not detected by a legacy device (e.g., a device in the second group of electronic devices 150) due to the low signal level, and then the legacy device performs a transmission without awareness of the ongoing LRLP transmission. The transmission by the legacy device generally overpowers the ongoing LRLP transmission, and interferes the ongoing LRLP transmission.

According to an aspect of the disclosure, the trigger device 110 is configured to generate and transmit a trigger signal to defer transmissions by the other devices. In response to the trigger signal, the first group of electronic devices 160A-N are configured to perform the LRLP transmissions with a specific preamble structure to improve immunity to interferences.

Specifically, in the FIG. 1 example, the trigger device 110 includes a transceiver circuit 113 and a processing circuit 120 coupled together as shown in FIG. 1. In the example, the transceiver circuit 113 includes a receiving circuit 116 and a transmitting circuit 115 that are both coupled to an antenna 114. In an example, the receiving circuit 116 includes a preamble processing circuit 117. The processing circuit 120 includes a trigger frame generation circuit 130 configured to generate a trigger frame.

The transceiver circuit 113 is configured to receive and transmit wireless signals. For example, the receiving circuit 116 is configured to generate electrical signals in response to captured electromagnetic waves by the antenna 114, process the electrical signals to extract digital streams from the electrical signals. The preamble processing circuit 117 is configured to detect various information from a preamble of a received signal, and use the information for, for example frame detection, automatic gain control (AGC), frequency offset estimation, synchronization, indication of modulation and coding scheme (MCS), channel estimation and the like.

In an example, the transmitting circuit 115 is configured to receive digital streams, such as management frames, data frames, trigger frames and the like from for example the processing circuit 120, generate radio frequency (RF) signals to carry the digital streams, and emit electromagnetic waves in the air via the antenna 114 to transmit wireless signals that carry the digital streams.

In an embodiment, the trigger frame generation circuit 130 is configured to generate the trigger frame that is used for protecting a channel to be used by the first group of electronic devices 160A-N. In an example, the trigger frame includes a duration field that carries a value corresponding to a time duration for channel protection. When the second group of electronic devices 150 receive the trigger frame, the second group of electronic devices 150 defer transmissions for a time duration based on the value in the duration field of the trigger frame. In another example, the trigger frame includes other suitable information that is implicitly indicative of a time duration for the second group of electronic devices 150 to defer transmissions.

In another embodiment, the trigger frame generation circuit 130 is configured to generate the trigger frame to carry control information for transmissions (uplink LRLP transmission) from the first group of electronic devices 160A-N to the trigger device 110. In an example, the trigger device 110 is a central control device that determines the control information, such as physical layer (PHY) information (e.g., modulation and coding scheme (MCS), multiple-input-multiple-output (MIMO), uplink data unit length, PHY classification) and the like, for uplink transmission from the first group of electronic devices 160A-N to the trigger device 110. The trigger frame generation circuit 130 then generates the trigger frame with the determined control information, and the transmitting circuit 115 transmits a trigger signal carrying the trigger frame. When the first group of electronic devices 160A-N receive the trigger signal and decode the trigger frame, the first group of electronic devices 160A-N perform uplink transmission according to the determined control information by the trigger device 110. Thus, in an example, because the trigger device 110 already knows the control information of the uplink transmission, the first group of electronic devices 160A-N have no need to include the control information in the uplink transmission, thus the first group of electronic devices 160A-N use simplified preamble structure in an example.

In another embodiment, the trigger frame generation circuit 130 is configured to generate the trigger frame to carry an indication of a selected preamble structure. In an example, the trigger device 110 receives information of the electronic device 160A, such as capacity information, location information, signal strength information, distance information, and the like. The trigger device 110 selects a preamble structure from a plurality of preamble structures based on the information of the electronic device 160A. The trigger frame generation circuit 130 then includes an indication that is indicative of the selected preamble structure in the trigger frame.

In another example, the trigger device 110 receives information of a plurality of IoT devices, such as the electronic device 160A and the electronic device 160N, that perform multi-user LRLP transmissions. The trigger device 110 determines a preamble structure that is supported by the plurality of IoT devices based on the received information. The trigger frame generation circuit 130 then includes an indication that is indicative of the determined preamble structure in the trigger frame. It is noted that the trigger device 110 can determines other suitable information, such as resource allocation information for the IoT devices, and the like and include the determined information in the trigger frame.

It is noted that the trigger frame can have any suitable format that can be decoded by the first group of electronic devices 160A-N and the second group of electronic devices 150. In an example, the trigger frame has a format defined by 802.11a. In another example, the trigger frame has a format in a mixed mode, such as format structures in FIG. 4. In another example, the trigger frame can have a specifically defined format that can be decoded by the first group of electronic devices 160A-N and the second group of electronic devices 150.

In an embodiment, the first group of electronic devices 160A-N are similarly configured. Using the electronic device 160A as an example, the electronic device 160A includes a transceiver circuit 163 and a processing circuit 170 coupled together. The transceiver circuit 163 includes a transmitting circuit 165 and a receiving circuit 166 that are both coupled to an antenna 164. The processing circuit 170 includes a trigger frame processing circuit 180 and a preamble generation circuit 190. Other electronic devices in the first group of electronic devices 160A-N utilize certain components that are identical or equivalent to those used in the electronic device 160A.

The transceiver circuit 163 is configured to receive and transmit wireless signals. For example, the receiving circuit 166 is configured to generate electrical signals in response to captured electromagnetic waves by the antenna 164, process the electrical signals to extract digital streams (e.g., frames) from the electrical signals and provide the digital streams to the processing circuit 170. In an example, the transmitting circuit 165 is configured to receive digital streams, such as management frames, data frames, and the like from for example the processing circuit 170, generate radio frequency (RF) signals to carry the digital streams, and emit electromagnetic waves in the air via the antenna 164 to transmit wireless signals that carry the digital streams.

The processing circuit 170 is configured to process received digital streams, and generate digital streams for transmission. For example, the trigger frame processing circuit 180 is configured to process a received trigger frame, and determine carried information in the trigger frame. The preamble generation circuit 190 is configured to generate a preamble for a frame in the physical layer according to a suitable preamble structure.

According to an aspect of the disclosure, the preamble generation circuit 190 can use a preamble structure in a greenfield mode or a mixed field for frames of uplink LRLP transmission. In the greenfield mode, the preamble structure includes fields in the LRLP configuration to enable a receiving device, such as the trigger device 110 to receive frames that are transmitted over a long range and low power. In the mixed mode, the preamble structure includes a first portion of fields in the legacy configuration, and a second portion of fields in the LRLP configuration. In an example, the second portion of fields can enable a receiving device, such as the trigger device 110 to receive frames that are transmitted over a long range and low power.

In an embodiment, the fields in the legacy configuration include a legacy short training field (L-STF) field, a legacy long training field (L-LTF) field, and a legacy signal field (L-SIG) field. In an example, the L-STF field, the L-LTF field and the L-SIG field are defined and used in transmissions according to legacy protocols (e.g., 802.11 a, b and g). In an example, the fields in the legacy configuration can be decoded by a legacy device, such as the second group of electronic devices 150 according to the legacy protocols, and are used for protecting channel for LRLP transmission.

Further, in an embodiment, the fields in the LRLP configuration include an LR-STF field, an LR-LTF field, and an LR-SIG field. In an example, the LR-STF field, the LR-LTF field, and the LR-SIG field are specifically configured in time and/or frequency domain(s) for uplink LRLP transmissions, such as disclosed in Applicant's co-pending application Ser. No. 15/332,531, filed Oct. 24, 2016, which is incorporated herein by reference in its entirety. For example, the LR-STF field, the LR-LTF field, and the LR-SIG field respectively include patterns that are repeated in time/or frequency domains for more times than corresponding patterns in the legacy configuration. Thus, in an example, the trigger device 110 receives a signal in the uplink LRLP transmission with a signal level that is lower than for example, a lower bound for the capability of the legacy protocols, the trigger device 110 can successfully receive and decode the signal in the uplink LRLP transmission based on the fields in the LRLP configuration.

In an embodiment, the preamble generation circuit 190 is configured to select a simplified preamble structure for LRLP transmission. In an example, the trigger frame serves for channel protection, and the preamble generation circuit 190 uses a preamble structure in the greenfield mode that has no legacy fields.

In another example, when the trigger frame carries PHY information for uplink LRLP transmission. The trigger frame processing circuit 180 decodes the PHY information from the trigger frame. The PHY information is then used in uplink LRLP transmission. Further, the preamble generation circuit 190 selects a preamble structure without an SIG field.

In an embodiment, the trigger device 110 determines a preamble structure, and provides an indication that is indicative of the preamble structure in the trigger frame. The trigger frame processing circuit 180 detects the indication in the trigger frame. The preamble generation circuit 190 then determines the preamble structure based on the indication.

In another embodiment, the preamble generation circuit 190 is configured to select a preamble structure from a plurality of preamble structures that are supported by the electronic device 160A. For example, the preamble generation circuit 190 can select the preamble structure based on a few parameters. In an example, the electronic device 160A detects a received signal level of the trigger signal, and dynamically selects one of the preamble structures based on the received signal level of the trigger signal. In another example, the preamble generation circuit 190 selects a preamble structure based on historical information of a plurality of preamble structures. For example, the preamble generation circuit 190 can check the successful rate of certain preamble types, then tradeoff between preamble simplicity and transmission robustness. For example, when a retransmit happens for a preamble structure, the preamble generation circuit 190 can switch to a more robust preamble type.

In another example, the preamble generation circuit 190 tries other types of preamble to figure out whether another type is sustainable for the current link. For example, the MAC algorithm implemented inside the electronic device 160A will decide the preamble structure.

In another example, the electronic device 160A uses information on the location of the trigger device 110, which can further help to get the accurate path loss between the trigger device 110 and the electronic device 160A.

It is noted that the electronic device 160A can decide the preamble structure for different optimization targets: such as simplicity, shorter preamble, link robustness, balance, and the like.

Figure 3:
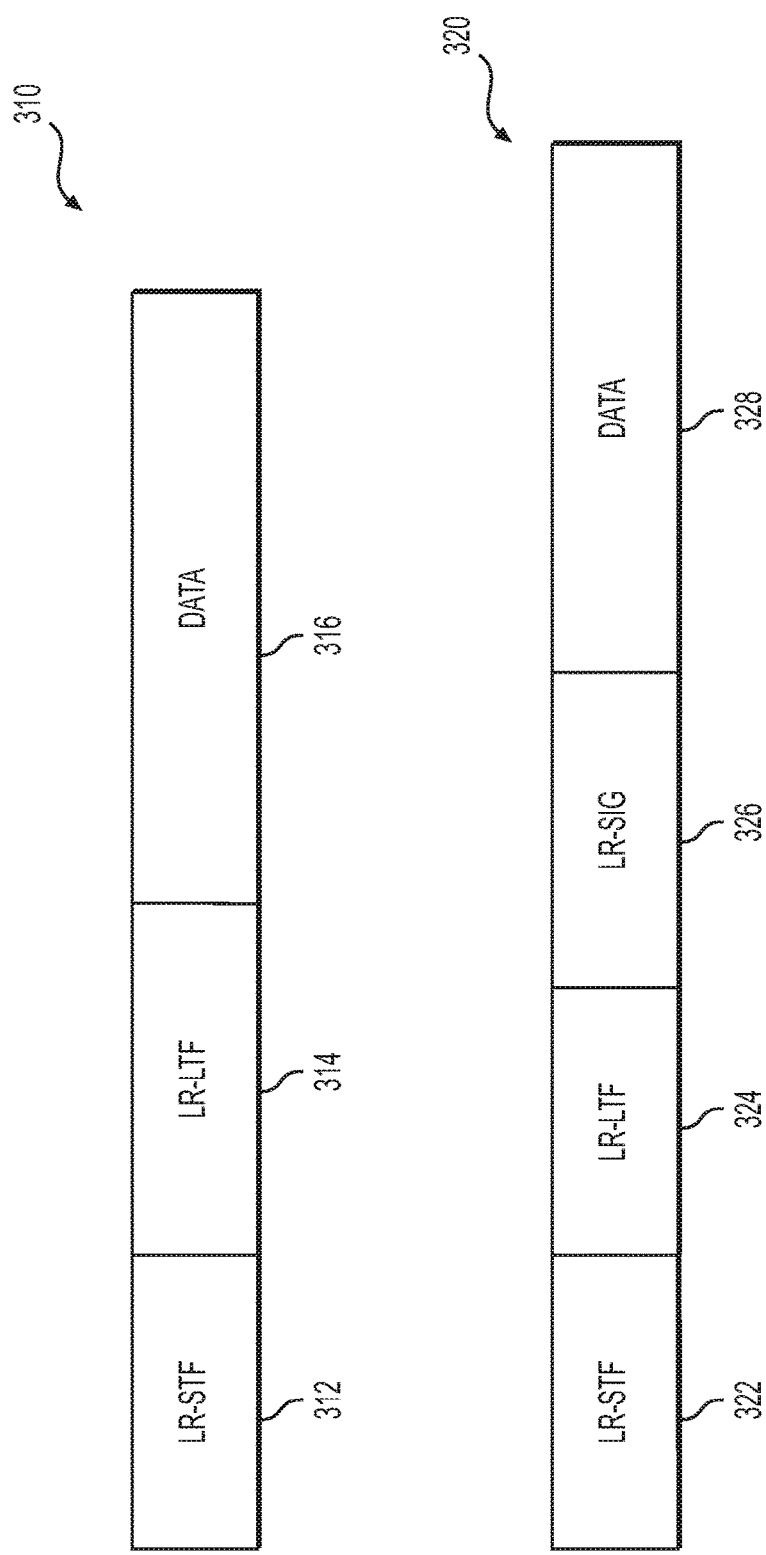
FIG. 3 shows examples of frame formats according to embodiments of the disclosure.
Figure 4:
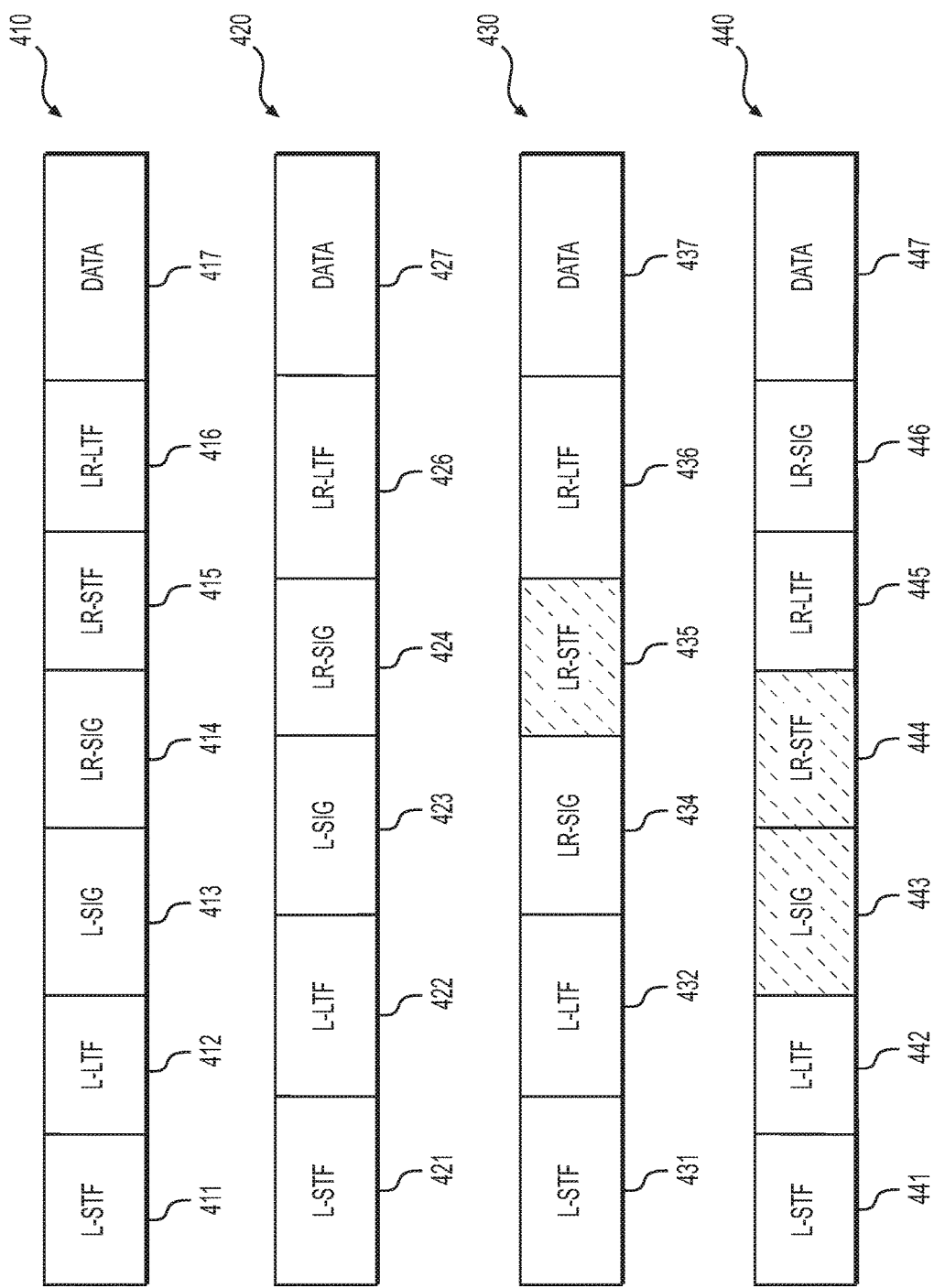
FIG. 4 shows more examples of frame formats according to embodiments of the disclosure.

Various preamble structures that can be used by the preamble generation circuit 190 are shown in FIG. 3 and FIG. 4.

According to an aspect of the disclosure, the processing circuit 170 can be implemented using various techniques. In an example, the processing circuit 170 is implemented using a processor. The processor is configured to execute software instructions to perform various functions. In another example, the processing circuit 170 includes application-specific integrated circuit (ASIC) configured to perform certain functions. In another example, the processing circuit 170 is configured to perform simple media access control (MAC) layer rules, and can be implemented using a relatively simple circuit to reduce cost.

According to an aspect of the disclosure, the trigger signal is used for protecting a communication channel for an uplink LRLP transmission from the electronic device 160A to the trigger device 110. Thus, in an example, the electronic device 160A is configured to omit clear channel assessment (CCA) before the uplink LRLP transmission in response to the trigger signal, and the electronic device 160A can be implemented using simplified circuits to reduce cost. In another example, the electronic device 160A is configured to perform CCA before the uplink LRLP transmission in response to the trigger signal.

Figure 2:
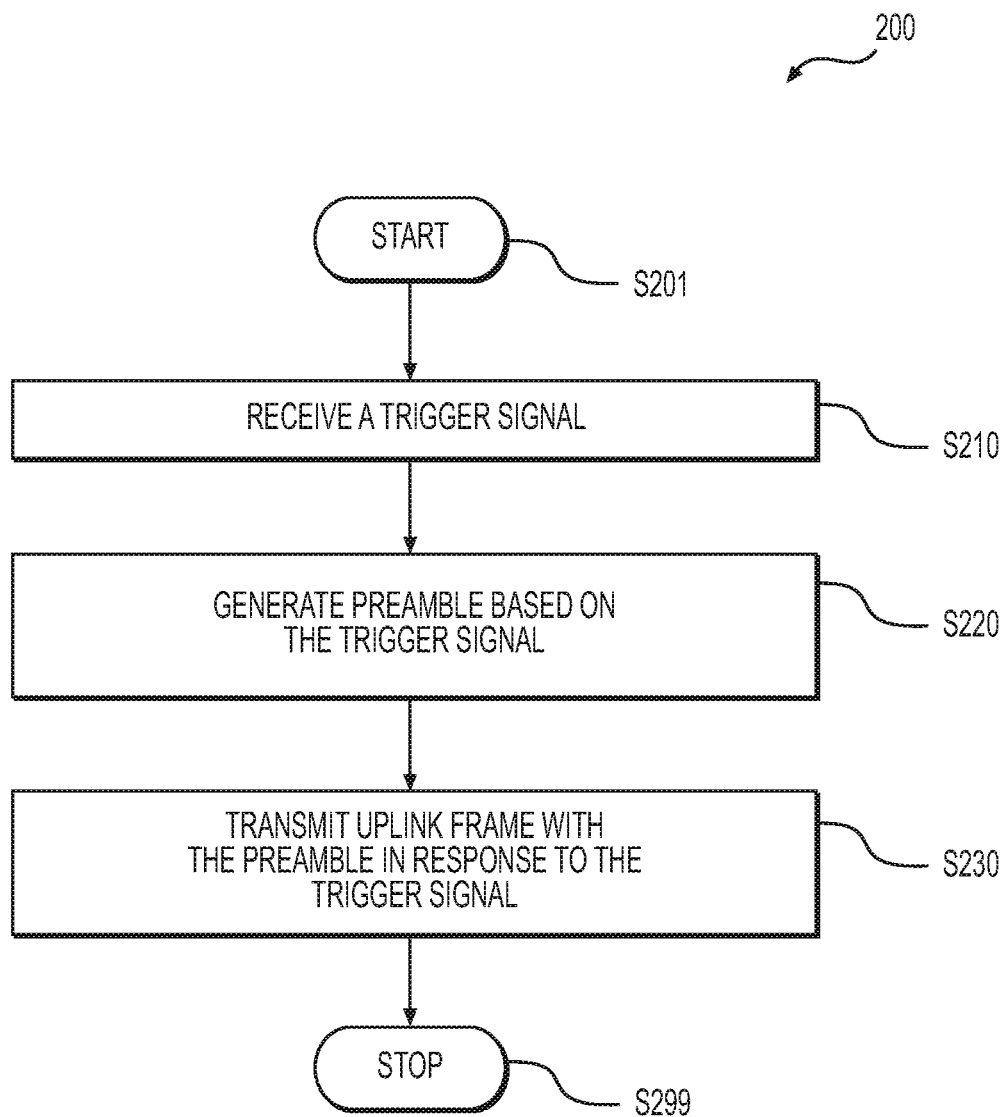
FIG. 2 shows a flow chart outlining a process 200 according to an embodiment of the disclosure.

FIG. 2 shows a flow chart outlining a process 200 according to an embodiment of the disclosure. In an example, the process 200 is executed by an electronic device in the first group of electronic devices 160A-N, such as the electronic device 160A in the FIG. 1 example. The process starts at S201, and proceeds to S210.

At S210, a trigger signal carrying a trigger frame is received. In an example, the trigger device 110 determines a time to collect, for example sensed parameters, by the first group of electronic devices 160A-N that are battery-powered remote sensors. At the time, the trigger device 110 generates and transmits a trigger signal that carries a trigger frame. The trigger signal serves for protecting channel of uplink LRLP transmission. When the second group of electronic devices 150 detects the trigger signal, the second group of electronic devices defer transmissions. In the FIG. 1 example, the transceiver 163 receives the trigger signal, and extracts the trigger frame.

At S220, a preamble is generated based on the trigger signal. In an example, the trigger frame serves for channel protection, and the preamble generation circuit 190 uses a preamble structure in the greenfield mode that has no legacy fields. In another example, the trigger frame carries PHY information for uplink LRLP transmission. Then, the preamble generation circuit 190 selects a preamble structure without an SIG field. In another example, in the trigger frame includes an indication of a preamble structure that is determined by the trigger device 110. The preamble generation circuit 190 then determines the preamble structure based on the indication. In another example, the electronic device 160A detects a few parameters, such as a received signal level, the location of the trigger device 110, the historical information of various preamble structures and the like, and select the preamble structure based on the parameters. For example, the electronic device 160A detects a received signal level of the trigger signal, and the preamble generation circuit 190 selects one of the preamble structures based on the received signal level of the trigger signal.

At S230, an uplink frame with the preamble is transmitted in response to the trigger signal. In an example, the electronic device 160A omits clear channel assessment (CCA), and transmits signals carrying a frame with the preamble in response to the trigger signal. In another example, the electronic device 160A is configured to perform CCA before transmitting signals carrying a frame with the preamble in response to the trigger signal. Then the process proceeds to S299 and terminates.

FIG. 3 shows examples of frame formats 310 and 320 according to embodiments of the disclosure. In an example, the frame formats 310 and 320 can be used by the first group of electronic devices 160A-N to generate frames in the physical layer for uplink LRLP transmissions. The frame formats 310 and 320 use the green field mode that omits a legacy portion in the preamble structure. Generally, the legacy portion in the preamble of a frame in an ongoing transmission enables a legacy device, such as the second group of electronic devices 150, to be aware of the ongoing transmission, and thus the legacy device can defer transmission accordingly and the channel of the ongoing transmission is protected. In an embodiment, the trigger signal that carries the trigger frame serves as channel protection, and the legacy portion in the preamble is omitted.

The frame format 310 includes an LR-STF field 312, an LR-LTF field 314 and a data field 316. The LR-STF field 312 and the LR-LTF field 314 form the preamble.

In an example, the trigger frame serves as the channel protection, and the trigger frame carries PHY parameters that are determined by the trigger device 110, thus an LR-SIG field is omitted. In the example, the processing circuit 170 generates a frame for uplink LRLP transmission using the frame format 310.

The frame format 320 includes an LR-STF field 322, an LR-LTF field 324, an LR-SIG field 326 and a data field 316. The LR-STF field 322, the LR-LTF field 324, and the LR-SIG field 326 form the preamble.

In an example, the trigger frame serves as the channel protection. The electronic device 160A determines one or more PHY parameters, use a signal field (e.g., LR-SIG field) to inform a receiving device, such as the trigger device 110 of the PHY parameters. In the example, the processing circuit 170 generates a frame for uplink LRLP transmission using the frame format 320.

FIG. 4 shows examples of frame formats 410-440 according to embodiments of the disclosure. In an example, the frame formats 410-440 can be used by the first group of electronic devices 160A-N to generate frames in the physical layer for uplink LRLP transmissions. The frame formats 410-440 uses a mixed mode in the preamble structure. In the mixed mode, a preamble structure includes a first portion (e.g., fields in the legacy configuration), and a second portion (e.g., fields in the LRLP configuration). Generally, the first portion in a frame of an ongoing transmission enables a legacy device, such as the second group of electronic devices 150, to be aware of the ongoing transmission, and thus the legacy device can defer transmission accordingly and the channel of the ongoing transmission is protected. The second portion is configured to assist a receiving device, such as the trigger device 110, to receive the LRLP transmission.

The frame format 410 includes an L-STF field 411, an L-LTF field 412, an L-SIG field 413, an LR-SIG field 414, an LR-STF field 415, an LR-LTF field 416 and a data field 417. The L-STF field 411, the L-LTF field 412, and the L-SIG field 413 form the first portion of the preamble structure, and the LR-SIG field 414, the LR-STF field 415, and the LR-LTF field 416 form the second portion of the preamble structure.

In an example, the L-STF field 411 is in the legacy configuration to assist coarse synchronization and setting gain for AGC at a receiving device, such as the trigger device 110; the L-LTF field 412 is in the legacy configuration to assist fine synchronization in temporal and frequency domains at a receiving device, such as the trigger device 110; and the L-SIG field 413 is in the legacy configuration to inform one or more PHY parameters to a receiving device, such as the trigger device 110.

In an example, the LR-STF field 415 is in the LRLP configuration to assist coarse synchronization and setting of gain for AGC at a receiving device, such as the trigger device 110; the LR-LTF field 416 is in the LRLP configuration to assist fine synchronization in temporal and frequency domains at a receiving device, such as the trigger device 110; and the LR-SIG field 414 is the LRLP configuration to inform one or more PHY parameters to a receiving device, such as the trigger device 110.

In an example, the data field 417 includes a data unit of the MAC layer.

The frame format 420 includes an L-STF field 421, an L-LTF field 422, an L-SIG field 423, an LR-SIG field 424, an LR-LTF field 426 and a data field 427. The frame format 420 omits an LR-STF field compared to the frame format 410, and the coarse synchronization and setting of gain for AGC at the receiving device are performed based on the L-STF field 421.

The frame format 430 includes an L-STF field 431, an L-LTF field 432, an LR-SIG field 434, an LR-STF 435, an LR-LTF field 436 and a data field 437. The frame format 420 omits an L-SIG field compared to the frame format 410. In an example, the LR-SIG field 434 is used to inform the PHY parameters to the receiving device. Further, in an example, the LR-STF field 435 is omitted.

The frame format 440 includes an L-STF field 441, an L-LTF field 442, an LR-SIG field 444, an LR-STF field 444, an LR-LTF field 445, an LR-SIG field 446 and a data field 437. The frame format 440 moves the position of the LR-SIG field after the LR-STF and LR-LTF compared to the frame format 410. Thus, in an example, the receiving device is in better synchronization with the signal of the uplink LRLP transmission after the LR-LTF field. Thus, in the example, the frame format 440 enables the receiving device to receive the LR-SIG field with better signal quality compared to the frame format 410. Further, in an example, the L-SIG 443 field and/or the LR-STF field are/is omitted.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
   a transceiver circuit configured to receive a trigger signal that is transmitted by another apparatus, the trigger signal triggering transmissions by a first group of apparatuses including the apparatus, and the trigger signal indicating for a second group of apparatuses to defer transmissions by the second group of apparatuses so that interferences with the transmissions by the first group of apparatuses are prevented; and
   a processing circuit configured to, in response to the trigger signal, generate a frame with a first preamble structure that is used by the first group of apparatuses, the first preamble structure being different from a second preamble structure that is used by the second group of apparatuses, and provide the generated frame to the transceiver circuit for transmission.

2. The apparatus of claim 1, wherein the processing circuit is configured to decode, from the trigger signal, one or more transmission control parameters in physical layer that are determined by the other apparatus, use the one or more transmission control parameters for transmission, and simplify the first preamble structure not to indicate the one or more transmission control parameters in the frame for transmission.

3. The apparatus of claim 2, wherein the processing circuit is configured to decode at least one of modulation coding scheme, multiple-input-multiple-output parameters and data unit length from the trigger signal.

4. The apparatus of claim 2, wherein the processing circuit is configured to simplify the first preamble structure to omit a signal field for carrying the one of more transmission control parameters.

5. The apparatus of claim 2, wherein the processing circuit is configured to omit one or more fields of the second preamble structure in the first preamble structure.

6. The apparatus of claim 2, wherein the processing circuit is configured to omit physical layer classification information in the first preamble structure.

7. The apparatus of claim 1, wherein the first preamble structure is configured to include more duplicated patterns in time/frequency domain than patterns in the second preamble structure.

8. The apparatus of claim 1, wherein the processing circuit is configured to select the first preamble structure from a plurality of preamble structures that are supported by the first apparatus based on an indication in the trigger signal.

9. The apparatus of claim 1, wherein the processing circuit is configured to cause the transceiver circuit to transmit in response to the trigger signal without clear channel assessment.

10. The apparatus of claim 1, wherein the processing circuit is configured to select the first preamble structure from a plurality of preamble structures that are supported by the apparatus.

11. A method of transmission, comprising:
receiving, by an apparatus, a trigger signal that is transmitted by another apparatus, the trigger signal triggering transmissions by a first group of apparatuses including the apparatus, and the trigger signal indicating for a second group of apparatuses to defer transmissions by the second group of apparatuses so that interference with the transmissions by the first group of apparatuses are prevented; and
generating a frame with a first preamble structure that is used by the first group of apparatuses, the first preamble structure being different from a second preamble structure that is used by the second group of apparatuses; and
transmitting a signal carrying the generated frame.

12. The method of claim 11, wherein generating the frame with the first preamble structure that is different from the second preamble structure that is used by the second group of apparatuses further comprises:
decoding, from the trigger signal, one or more transmission control parameters in physical layer that are determined by the other apparatus;
simplifying the first preamble structure not to indicate the one or more transmission control parameters in the frame for transmission; and
transmitting the signal carrying the generated frame based on the one or more transmission control parameters.

13. The method of claim 12, wherein decoding, from the trigger signal, the one or more transmission control parameters in physical layer that are determined by the other apparatus further comprises:
decoding at least one of modulation coding scheme, multiple-input-multiple-output parameters and data unit length from the trigger signal.

14. The method of claim 12, wherein simplifying the first preamble structure not to indicate the one or more transmission control parameters in the frame for transmission further comprises:
simplifying the first preamble structure to omit a signal field for carrying the one of more transmission control parameters.

15. The method of claim 12, further comprising:
omitting one or more fields of the second preamble structure in the first preamble structure.

16. The method of claim 12, further comprising:
omitting physical layer classification information in the first preamble structure.

17. The method of claim 12, wherein transmitting the signal carrying the generated frame based on the one or more transmission control parameters further comprises:
transmitting in response to the trigger signal without clear channel assessment.

18. The method of claim 11, further comprising:
repeating patterns in the second preamble structure in time/frequency domain;
including the repeated patterns in the first preamble structure.

19. The method of claim 11, further comprising:
selecting the first preamble structure from a plurality of preamble structures based on an indication in the trigger signal.

20. The method of claim 11, further comprising:
detecting the trigger signal; and
selecting the first preamble structure from a plurality of preamble structures that are supported by the apparatus.

* * * * *